United States Patent [19]
Ramesh et al.

[11] Patent Number: 5,838,739
[45] Date of Patent: Nov. 17, 1998

[54] CHANNEL ESTIMATOR CIRCUITRY, AND ASSOCIATED METHOD, FOR A DIGITAL COMMUNICATION SYSTEM

[75] Inventors: Rajaram Ramesh; Gregory E. Bottomley; Ravinder David Koilpillai, all of Cary; Ali S. Khayrallah, Apex, all of N.C.

[73] Assignee: Ericsson Inc.

[21] Appl. No.: 625,010

[22] Filed: Mar. 29, 1996

[51] Int. Cl.⁶ ................................................. H04B 1/10
[52] U.S. Cl. ........................................ 375/348; 375/340
[58] Field of Search .................................. 375/348, 340, 375/232, 346; 455/63

[56] References Cited

U.S. PATENT DOCUMENTS

| | | | |
|---|---|---|---|
| 4,815,103 | 3/1989 | Cupo et al. ................................ | 375/14 |
| 5,191,598 | 3/1993 | Backstrom et al. ..................... | 375/340 |
| 5,204,878 | 4/1993 | Larsson ..................................... | 375/14 |
| 5,228,057 | 7/1993 | Larsson ..................................... | 375/232 |
| 5,263,026 | 11/1993 | Parr et al. ................................. | 370/95 |
| 5,263,053 | 11/1993 | Wan et al. ................................. | 375/340 |
| 5,313,495 | 5/1994 | Kim ............................................ | 375/340 |
| 5,347,541 | 9/1994 | Iltis et al. .................................. | 375/12 |
| 5,432,816 | 7/1995 | Gozzo ....................................... | 375/232 |
| 5,432,821 | 7/1995 | Polydoros et al. ...................... | 375/340 |
| 5,436,928 | 7/1995 | Fukuawa et al. ........................ | 375/232 |
| 5,471,501 | 11/1995 | Parr et al. ................................. | 375/354 |
| 5,481,572 | 1/1996 | Sköld et al. .............................. | 375/347 |
| 5,533,067 | 7/1996 | Jamal et al. .............................. | 375/341 |
| 5,596,607 | 1/1997 | Larsson et al. .......................... | 375/340 |

FOREIGN PATENT DOCUMENTS

| | | |
|---|---|---|
| 0 396 101 A2 | 11/1990 | European Pat. Off. . |
| 0 448 069 A2 | 9/1991 | European Pat. Off. . |
| 0 604 209 A2 | 6/1994 | European Pat. Off. . |
| WO 95/33314 | 12/1995 | WIPO . |

OTHER PUBLICATIONS

Stefan A. Fechtel and Heinrich Meyr; *Optimal parametric Feedforward Estimation of Frequency–Selective Fading Radio Channels*; IEEE Transactions on Communications, Feb., Mar., Apr. 1994, No. 2/3/4, New York; pp. 1639–1650.

*Primary Examiner*—Temesghen Ghebretinsae
*Attorney, Agent, or Firm*—Jenkens & Gilchrist, P.C.

[57] ABSTRACT

Channel estimator circuitry and associated method for a digital receiver operates to estimate a channel impulse response of a transmission channel. When intersymbol interference is introduced upon a communication signal only by circuitry of a transmitter and a receiver, the quality of channel estimation is improved. Even when intersymbol interference is introduced upon a communication signal during its transmission, the quality of channel estimation is improved by decomposing the components of the intersymbol interference into portions introduced during transmission of the signal upon a communication channel and portions introduced by the transmitter and receiver circuitry.

18 Claims, 4 Drawing Sheets

CHANNEL ESTIMATOR CIRCUITRY, AND ASSOCIATED METHOD, FOR A DIGITAL COMMUNICATION SYSTEM

The present invention relates generally to estimator circuitry for a digital receiver operable in a digital communication system. More particularly, the present invention relates to channel estimator circuitry, and an associated method, for estimating channel characteristics of a transmission channel, including transmitter and receiver filter circuitry, upon which a digital communication signal is transmitted.

The channel estimator circuitry, and the associated method of channel estimation, provides a channel estimate of improved quality. Because the quality of the channel estimate is improved, recovery of the informational content of the communication signal is facilitate. The circuitry and method can be advantageously utilized in a satellite communication system in which intersymbol interference introduced upon a communication signal transmitted between a transmitter and a receiver is introduced only by filter circuitry of the transmitter and receiver. The circuitry and method is also advantageously utilized in other communication systems, such as a digital cellular communication system.

BACKGROUND OF THE INVENTION

A communication system is formed, at a minimum, of a transmitter and a receiver interconnected by a communication channel. The communication system is operable at least to transmit communication signals, having an informational content, generated at, or applied to, the transmitter upon the communication channel. The receiver is operable to receive the transmitted, communication signal and to recreate the informational content of the communication signal.

A radio communication system is a communication system in which the communication channel is formed of one or more frequency bands of the electromagnetic frequency spectrum. A transmitter operable in a radio communication system generates a communication signal of characteristics permitting its transmission upon the communication channel, and the receiver operable in the radio communication system is operable to receive the communication signal transmitted upon the communication channel.

Typically, the radio receiver includes tuning circuitry tunable to the frequencies of the communication channel upon which the communication signal is transmitted, down-conversion circuitry for down-converting a receive signal formed of the communication signal from a transmission frequency into a lower frequency, or baseband, signal, demodulation, and decoder circuitry which permit the informational content of the communication signal to be recreated. A radio communication system is advantageous for the reason that a fixed, or hard-wired, connection is not required to form the communication channel extending between the transmitter and receiver. Communication can be effectuated between remotely-positioned transmitters and receivers without the need to form the hard-wired or other fixed connection therebetween.

Technological advancements in communication technologies have permitted communication systems to utilize digital communication techniques. Some existing communication systems have been converted to permit the utilization of digital communication techniques; other communication systems have been planned, or have been made possible, as a result of such technological advancements. Utilization of digital communication techniques is advantageous as information can be more efficiently transmitted upon a communication channel than by utilizing conventional, analog communication techniques. Also, some transmission difficulties which distort the communication signal as the communication signal is transmitted by a transmitter to a receiver can sometimes be more readily overcome when digital communication techniques are utilized.

A transmitter operable in such a communication system digitizes an information signal to form a digital signal. Once digitized, the digital signal can be modulated by a digital modulation technique, such as by a Gaussian Minimum Shift Keying (GMSK) modulation technique. The digitized signal, once modulated, is transmitted upon a communication channel.

A receiver operable to receive the signal transmitted upon communication channel includes circuitry to demodulate the signal received thereat and to form a digitized signal which can then be converted into another form, if desired, such as by a decoding process.

Distortion is sometimes introduced upon the signal transmitted by the transmitter. The distortion can, for instance, be caused by filter circuitry of the transmitter, or filter circuitry of the receiver, or the communication channel. The filter circuitry of the transmitter, the communication channel, and the filter circuitry of the receiver shall, at times, be together referred to as the "transmission channel" below.

One type of distortion which is sometimes introduced on the signal is referred to as intersymbol interference. The causes of intersymbol interference and the distortion caused therefrom is well-known.

Receivers operable to receive signals in a digital communication system sometimes include circuitry, referred to as channel estimator circuitry, which estimates the channel characteristics, namely, the channel impulse response, of the transmission channel. Such channel estimators generate an estimate of a channel impulse response of the transmission channel. The channel impulse response estimated by the channel estimator is used by receiver equalizer circuitry to counteract for the intersymbol interference, thereby to permit the receiver to recreate more accurately the informational content of the communication signal actually formed at the transmitter.

The quality of the channel estimate is important since an accurate estimation of the channel impulse response is determinative of the ability of the receiver equalizer to counteract for intersymbol interference, a high-quality channel estimator able to accurately estimate the channel impulse response is necessary.

Any manner by which to improve the quality of the channel estimate would therefore be beneficial to facilitate better the recreation at the receiver of a signal transmitted thereto.

It is in light of this background information related to digital communication systems, and channel estimator circuitry operable therein, that the significant improvements of the present invention have evolved.

SUMMARY OF THE INVENTION

The present invention advantageously provides channel estimator circuitry, and an associated method, of obtaining a channel estimate of improved quality. When embodied to form a portion of a digital receiver operable in a digital communication system, the accuracy of an estimate of the channel characteristics of the transmission channel upon which signals are transmitted to the receiver is improved, thereby facilitating the accurate recreation of the informational content of the signal transmitted to the receiver.

The circuitry and method is advantageously utilized to form a portion of the receiver circuitry used in a satellite communication system in which intersymbol interference introduced upon a communication signal transmitted between a transmitter and a receiver operable therein is introduced primarily by filter circuitry of a transmitter which transmits the communication signal and a receiver which receives the communication signal. When intersymbol interference is not introduced upon the transmitted signal during transmission upon a variable, communication channel, but rather is introduced only at the transmitter and receiver, the parameters required to be calculated by the channel estimator circuitry are reduced, thereby to improve the efficiency of the estimation. An uplink of a satellite communication system is exemplary of a communication system having a communication channel upon which little intersymbol interference is introduced during its transmission thereupon. In such a system, intersymbol interference introduced upon the communication signal is introduced primarily by the filter circuitry of the transmitter and receiver. Because the characteristics of the filter circuitry of the fixed devices are determinable, viz., essentially known quantities, advantage of this determinable quantity is made to improve the quality of channel estimation, thereby to facilitate subsequent operation of equalizer circuitry to correct for distortions caused by intersymbol interference introduced upon a signal during its transmission to the receiver.

The circuitry and method is also advantageously utilized in a communication system, such as a cellular communication system, in which intersymbol interference is introduced also upon a communication channel during transmission of the communication signal between a transmitter and a receiver. By decomposing the distortion introduced upon the communication signal into distortion component portions, the component portions of the distortion caused by the transmitter and receiver filters are, again, essentially known quantities, and are therefore determinable. Advantage is taken of the determinability of the intersymbol interference introduced upon the communication signal by the transmitter and receiver circuitry to improve the quality of the channel estimator circuitry. The circuitry and method is further also advantageously utilized when just the component portion of distortion caused by the transmitter filter is essentially a known quantity.

In one aspect of the present invention, a channel estimator estimates a channel impulse response of a transmission channel upon which a communication signal having synchronization symbols is transmitted by a transmitter. The communication signal is transmitted at a communication symbol rate to a receiver. A symbol sampler is coupled to receive signals representative of the communication signal received by the receiver. The symbol sampler samples values of synchronization symbols of the signal, such as portions of the signal corresponding to a synchronization word, at a sampling rate greater than the communication signal symbol rate. Each of the synchronization symbols is thereby sampled at least at a first sampling point and at a second sampling point. At least a first sampled signal and a second sampled signal of values representative of the synchronization symbols sampled at the first and second sampling points is generated. Correlator circuitry is coupled to receive the sampled signals generated by the symbol sampler. The correlator circuitry correlates portions of the sampled signals with stored data words. The stored data word is of values representative of the synchronization symbols modified by a selected level of distortion introduced upon the communication signal by the transmitter and the receiver, prior to transmission and subsequent to reception, respectively, of the communication signal. The correlator circuitry further selects which of the first sampled signal and the second sampled signal correlates most closely with the stored data word, thereby to estimate the channel impulse response.

In another aspect of the present invention, a channel estimator estimates a channel impulse response of a transmission channel upon which a communication signal having synchronization symbols is transmitted by a transmitter. The communication signal is transmitted at a communication signal symbol rate to a receiver. A symbol sampler is coupled to receive signals representative of the communication signal received by the receiver. The symbol sampler samples values of synchronization symbols, such as portions of the signal corresponding to a synchronization word, of the signal and generates a sampled signal representative thereof.

Correlator circuitry is coupled to receive the sampled signals generated by the symbol sampler. The correlator circuitry correlates portions of the sampled signals with stored data words. The stored data words are of values representative of the synchronization symbols modified by selected levels of distortion introduced upon the communication signal by the transmitter and the receiver, prior to transmission and subsequent to reception, respectively, of the communication signal. The levels of distortion correspond to different sampling points. The correlator circuitry further selects which of the sampled signals correlates most closely with the stored data word, thereby to estimate the channel impulse response.

In these and other aspects, a channel estimator, and an associated method, for a digital receiver is disclosed. A symbol sampler is coupled to receive signals representative of a communication signal received by the receiver. The communication signal includes synchronization symbols, and the symbol sampler samples values of at least the synchronization symbols of the signal and to generate sampled signals representative thereof. Metric calculating circuitry, such as correlator circuitry, is coupled to receive the sampled signals generated by the symbol sampler. The metric calculating circuitry calculates metrics upon portions of the sampled signals with a stored data word. Responsive to such metric calculations performed by the metric calculating circuitry, the channel impulse response corresponding to, e.g., best metric is estimated.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
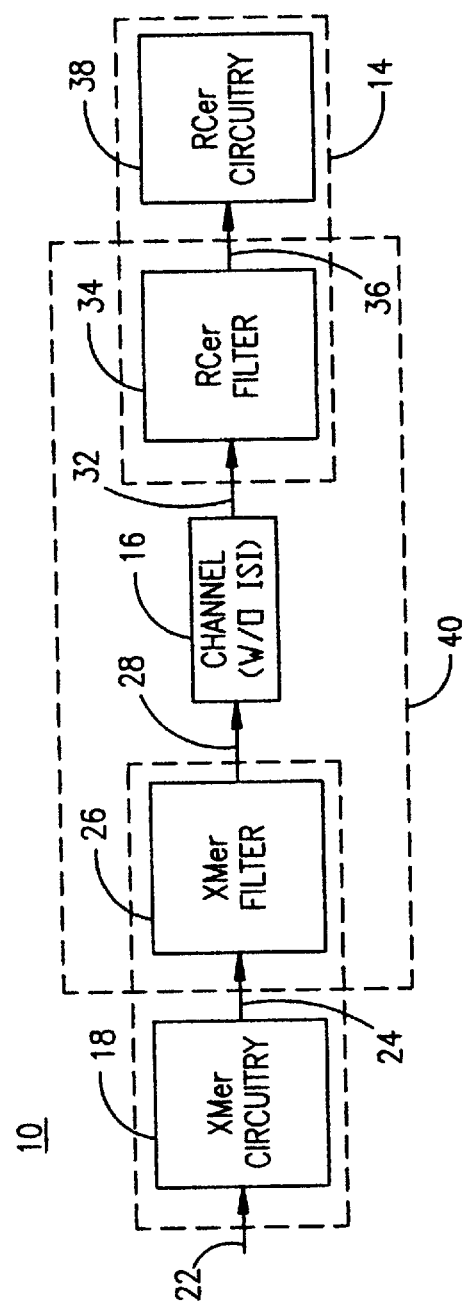
FIG. 1 illustrates a functional block diagram of a communication system in which an embodiment of the present invention is operable.

Referring first to FIG. 1, a communication system, shown generally at 10, permits the communication of a communication signal transmitted by a transmitter 12 to a receiver 14 by way of a communication channel 16. The communication system 10 is a digital communication system wherein the transmitter 12 forms a digital transmitter and the receiver 14 forms a digital receiver.

The transmitter 12 includes transmitter circuitry 18 which is operable here to digitize an informational signal applied to the circuitry 18 by way of the line 22. In other embodiments, of course, an already-digitized signal can instead be applied to the circuitry 18 on the line 22. The transmitter circuitry further is operable to modulate the digitized signal according to a digital modulation technique.

A modulated signal is generated by the transmitter circuitry on line 24 which is coupled to a transmitter filter 26, such as a portion of a duplexer filter. The transmitter filter 26 filters the modulated signal applied thereto to form a transmit signal on line 28. While not separately shown, the transmit signal is formed by an antenna device which transduces an electrical signal into electromagnetic form in conventional manner.

The transmit signal is transmitted upon the communication channel 16 to the receiver 14. The receiver 14 is tunable to the frequencies encompassed by the communication channel 16 to receive the transmit signal, referred to as the receive signal, once received by the receiver. Again, while not separately shown, the receiver includes an antenna device to convert the receive signal into electrical form.

The receiver 14 includes a receiver filter 34 which receives the receive signal applied thereto on line 32. The receiver filter generates a filtered, receive signal on line 36 which is applied to receiver circuitry 38.

The receiver circuitry 38 includes demodulator circuitry corresponding to the modulation circuitry of the transmitter circuitry 18. The demodulation circuitry is operable to demodulate the receive signal, once filtered by the receiver filter 34. The receiver circuitry 38 also includes equalizer circuitry and decoder circuitry for equalizing and decoding the receive signal, once demodulated by the demodulator circuitry thereof.

As described previously, intersymbol interference is sometimes introduced upon the signal generated by the transmitter circuitry 18. In some communication systems, such as a satellite communication system, the intersymbol interference is not introduced primarily during transmission of the transmit signal upon the communication channel 16. Instead intersymbol interference is primarily introduced by the transmitter filter 26 and the receiver filter 34 during their respective filtering operations. Such intersymbol interference distorts the informational content of the signal applied to the receiver circuitry 38 on the line 36.

Channel estimation circuitry is sometimes included as a portion of the receiver circuitry 38 to estimate channel impulse responses. Such estimates are provided to equalizer circuitry, operative to distortion which distorts the informational content of the communication signal.

The channel estimator circuitry of an embodiment of the present invention takes advantage of the determinable nature of the intersymbol interference caused by the transmitter and receiver filters 26 and 34 to simplify the calculation required to estimate the channel impulse response of a transmission channel 40, defined to be formed of the communication channel 16 together with the filters 26 and 34. Such estimations permit distortions introduced upon the communication signal to be counteracted by equalizer circuitry.

In a communication system in which intersymbol interference is caused primarily by the transmitter and receiver filters, by knowing the characteristics of the transmitter and receiver filters, the quality, i.e., accuracy, of estimations formed by the channel estimator is improved. In communication systems in which intersymbol interference is additionally introduced upon the transmit signal when transmitted upon the channel 16, the channel estimator circuitry of an embodiment of the present invention is also operative to estimate the channel impulse response, thereby to facilitate the effects of the intersymbol interference to be counteracted by equalizer circuitry, by decomposing the components of the intersymbol interference into channel-introduced component portions and filter-induced component portions. Because the channel estimator is able to estimate the distortion caused by intersymbol interference using calculations with fewer parameters, improved recreation of the transmitted signal is facilitated.

Figure 2:
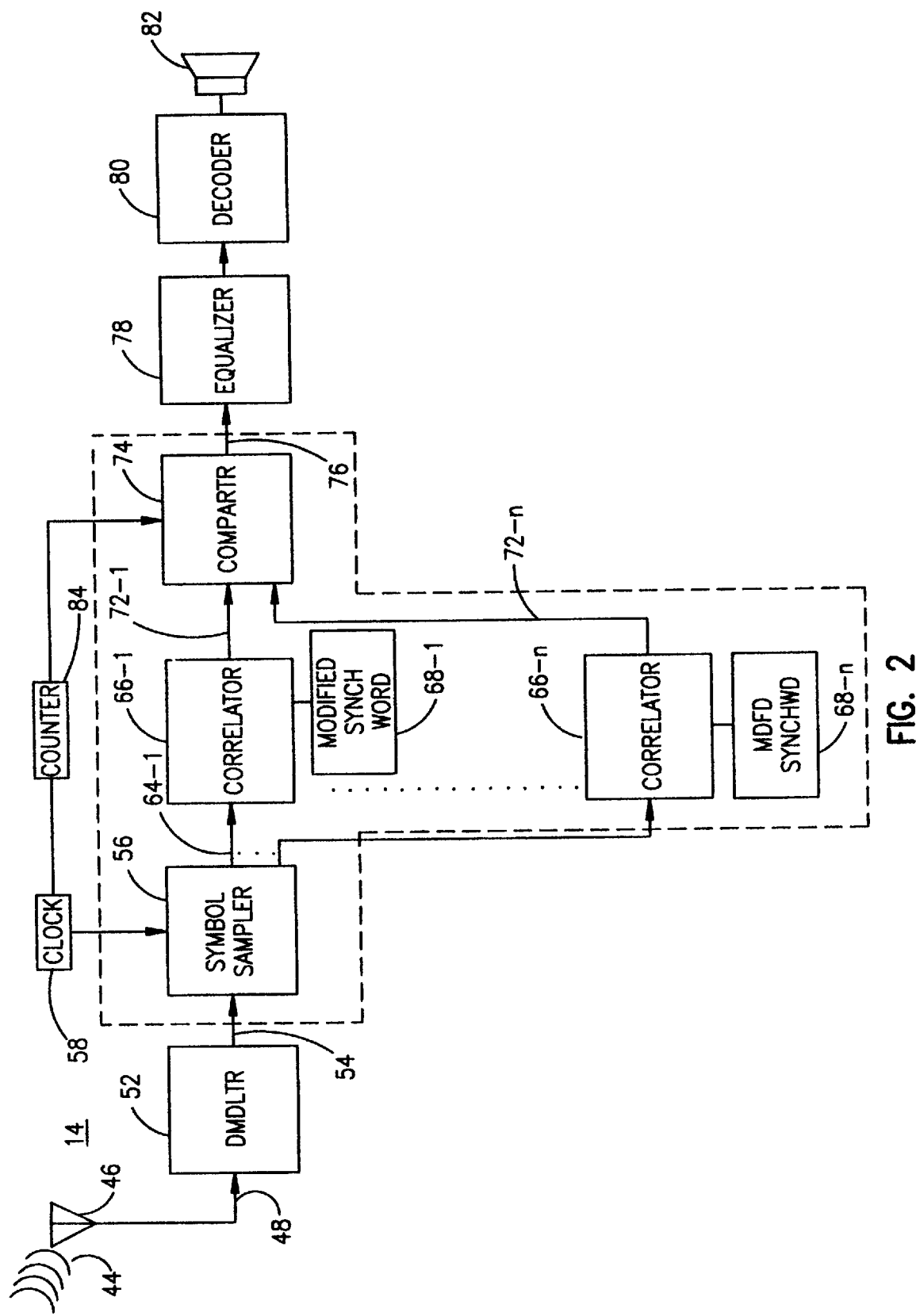
FIG. 2 illustrates a functional block diagram of a digital receiver which includes the channel estimator circuitry of an embodiment of the present invention.

FIG. 2 illustrates the receiver 14 of an embodiment of the present invention. Receive signals 44 are detected by an antenna device 46 and converted into electrical form on line 48. Line 48 is coupled to a demodulator 52 which demodulates the signals applied thereto on line 48. The demodulator 52 generates demodulated signals on line 54 which are applied to a symbol sampler 56.

The symbol sampler 56 samples the signals applied thereto on line 54 at a rate in excess of the symbol rate of the signal. Here, a clock 58 is coupled to the symbol sampler 56 by way of line 62 to sample the symbols of the signal applied thereto, for example, on each rising or falling edge of the clock signal generated by the clock 58. In one embodiment, the symbol sampler 56 is operable to oversample the signal applied thereto at eight times the symbol rate.

The symbol sampler 56 generates sampled signals on the lines 64-1 through 64-$n$ which are applied to correlators 66-1 through 66-$n$. The sampled signals generated on different ones of the lines 64 correspond to sampling positions of each symbol at which the symbol is sampled. For instance, a first sampled signal generated on line 64-1 is of values corresponding to first sampling position of each of the symbols sampled by the symbol sampler 56, and the sampled signal generated on line 64-$n$ is of a sampled signal sampled at the nth sampling position of the symbols at which each of the symbols is sampled.

Each of the correlators 66-1 through 66-$n$ correlate synchronization words which form portions of the sampled signals with stored synchronization words stored in memory elements 68-1 through 68-$n$. The stored synchronization words are of values of the synchronization word known to be transmitted by a transmitter, such as the transmitter 12 shown in FIG. 1, but modified by values representative of distortion introduced by the transmitter and receiver filters, such as the filters 26 and 34 shown in FIG. 1.

The correlators 66-1 through 66-$n$ correlate values of the modified synchronization words stored in the memory elements 68-1 through 68-$n$ with corresponding sampled signals generated on the lines 64-1 through 64-$n$, respectively. The correlators generate signals on lines 72-1 through 72-$n$ which are applied to a comparator 74. In other embodiments, other metric calculating circuitry is substituted for the correlator circuitry.

The comparator 74 compares levels of correlation determined by the correlators and pass a sampled signal on line 76 corresponding to the sampled signal applied to the correlators 66-1 through 66-n which exhibits the greatest correlation with the modified synchronization word stored in the memory elements 68-1 through 68-n. Line 76 is coupled to an equalizer 78 and a decoder 80 which is operable in conventional manner. The decoder 80 in turn, is coupled to a transducer, here a speaker 82, also in conventional manner.

FIG. 2 further illustrates a counter 84 coupled to receive clock signals generated by the clock 58 to cause resetting of the comparator 74 at selected times.

The symbol sampler 56, the correlators 66-1 through 66-n, the memory elements 68-1 through 68-n, and the comparator 74 together form equalizer circuitry, referred to by reference numeral 86 in the figure.

Figure 3:
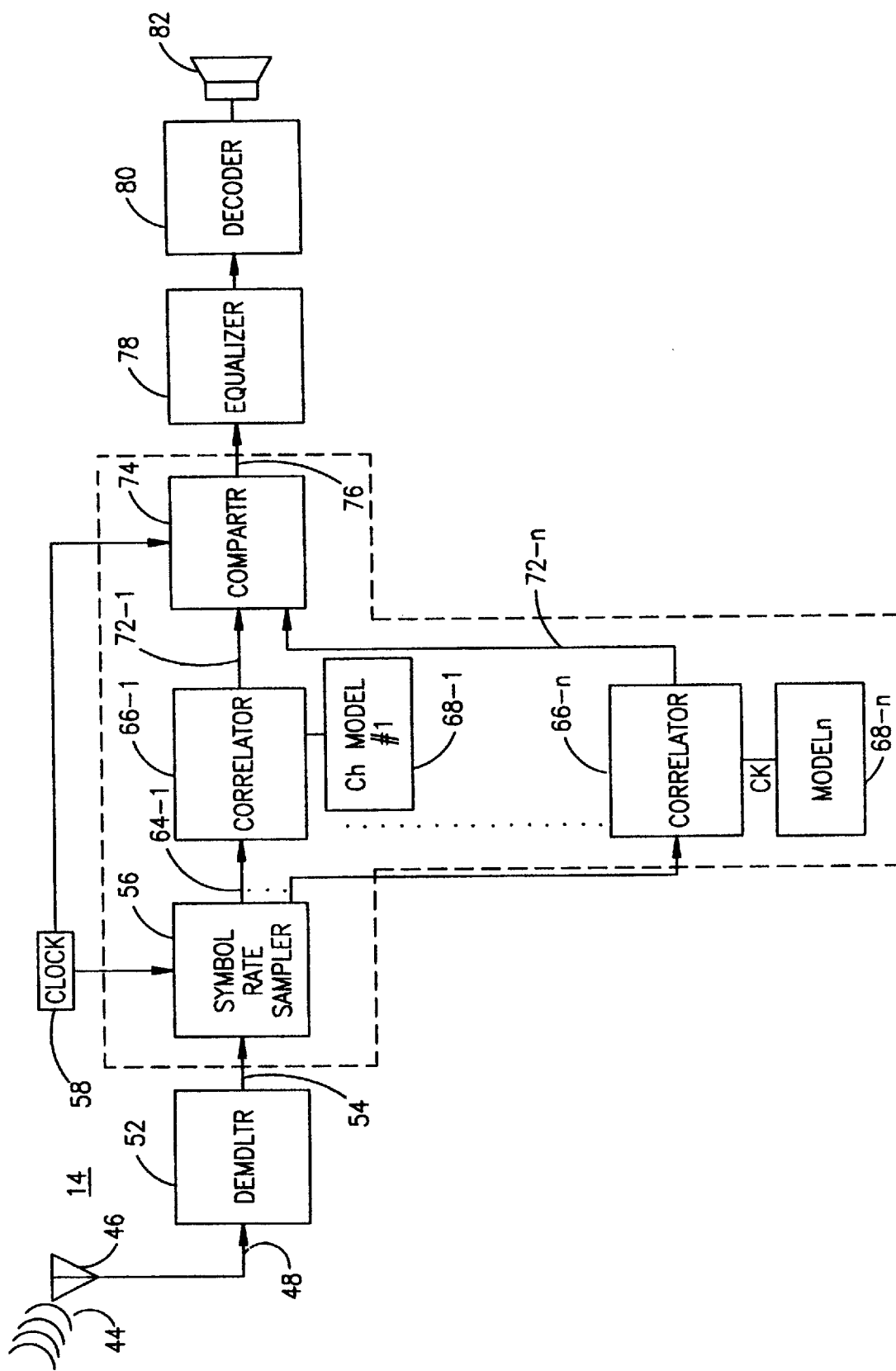
FIG. 3 illustrates a functional block diagram, similar to that shown in FIG. 2, but of a digital receiver which includes the channel estimator circuitry of another embodiment of the present invention.

FIG. 3 illustrates a receiver 14 of another embodiment of the present invention. Again, receive signals 44 are detected by an antenna device 46 and are converted into electrical form on line 48. Line 48 is coupled to a demodulator 52 which demodulates the signals applied thereto and generates a demodulated signal on line 54.

Line 54 is coupled to a symbol sampler 56 which samples the signals applied thereto. The symbol sampler 56 is coupled to a clock 58 by way of line 62 and samples the demodulated signals applied thereto responsive, for example, to rising or falling clock edges of clock pulses generated by the clock 58. In this embodiment, the symbol sampler 56 samples each symbol of the signal applied thereto one time. That is to say, in contrast to the embodiment illustrated in FIG. 2, the symbol sampler 56 of the embodiment shown in FIG. 3 does not oversample the symbols of the demodulated signal.

The symbol sampler 56 generates a sampled signal on line 64 which is applied to correlators 66-1 through 66-n. The correlators 66-1 through 66-n are also coupled to memory elements, here memory elements 88-1 through 88-n. The memory elements 88-1 through 88-n store different values in contrast to the same values stored in the memory elements 68-1 through 68-n of the embodiment shown in FIG. 2.

The correlators generate signals on lines 72-1 through 72-n which are applied to a comparator 74. The comparator 74 is again operable to compare the levels of correlation determined by the correlators and to pass the signal on line 76 corresponding to the greatest, exhibited level of correlation. Line 76 is again coupled to a decoder 78 and, in turn, to a transducer 82.

The clock 58 is further coupled to the comparator 74 to cause resetting of the comparator 74 at selected times.

The symbol sampler 56, correlators 66-1 through 66-n, comparator 74, and memory elements 88-1 through 88-n together form equalizer circuitry, here represented by reference numeral 186.

The channel impulse response of a signal received by the receiver 14 is represented by the following equation:

$$c(t) = a \sum_{k=0}^{n-1} c_k \delta(t - kT)$$

Wherein:
a is a fading level; and
$c_k$ are values of impulse response taps arising due to the transmit and receive filters.

As mentioned previously, distortion introduced upon a communication signal by the transmitter and receiver filters is determinable. Because the transmitter and receiver filters, such as the filters 24 and 36 shown in FIG. 1, are essentially fixed devices having fixed characteristics, values of $c_k$ are essentially known quantities for any sampling point k. Advantage is taken of the determinable nature of the values of $c_k$. Thereby, only the quantity a of the above equation is required to be estimated and such estimation can be performed by utilizing the available information concerning $c_k$.

The embodiment shown in and described with respect to FIG. 2 utilizes an oversampling receiver in which sampling at a plurality of sampling positions, within a symbol period, are correlated with a known synchronization word passed through a preferred set of $c_k$'s. In the embodiment of FIG. 2, the sampling position at which an optimal correlation is detected is chosen, and the corresponding value of a is determined from the correlation.

In the embodiment illustrated in FIG. 3, oversampling is not utilized. Instead, a receive signal is sampled at a rate of one sample per symbol. In this embodiment, the memory elements 88-1 through 88-n store multiple models of $c_k$. The best estimate of the multiple models is chosen responsive to correlations performed by the multiple member of correlators. The best estimate is chosen responsive to the correlations performed thereat. Again, in other embodiments, other metric calculations can be substituted for correlation operations of correlators.

In another embodiment, conventional correlation operations can be performed with an estimated value of the combination of a and $c_k$. Thereafter, a choice of sampling positions and the value of a is made to fit the model of a, $c_k$ for different values of $c_k$.

When intersymbol interference is introduced upon the communication channel, such as the communication channel 16, decomposition of the actual transmission channel, into the communication channel 16 and including the filters 26 and 34 is made. The channel impulse response of a signal received by the receiver 14, is, instead, represented by the following convolution equation:

$$c(t) = \sum_{l=0}^{L-1} a_l \delta(t - lT) * \sum_{k=0}^{N-1} c_k \delta(t - kT)$$

Wherein the terms are as described previously. Analogous such decomposition can be performed when only the characteristics of the transmitter filter are determinable.

Calculation of the channel impulse response is again simplified as the values of c are determinable and need not be calculated. For instance, if the contribution due to the transmit and receive filters 26 and 34 give rise to taps ($c_0$, $c_1$, and $c_2$), and the contribution due to the fading channel might be represented by ($a_0$, $a_1$), the combination is ($c_0 a_0$, $c_1 a_0$+ $c_0 a_1$, $c_2 a_0 + c_0 a_1$, $c_2 a_1$) because there are only two independent taps since the channel only produces two taps. The estimator circuitry is thereby required only to estimate $a_0$ and $a_1$ thereby reducing the complexity of calculations required to be performed by the channel estimator circuitry.

Figure 4:
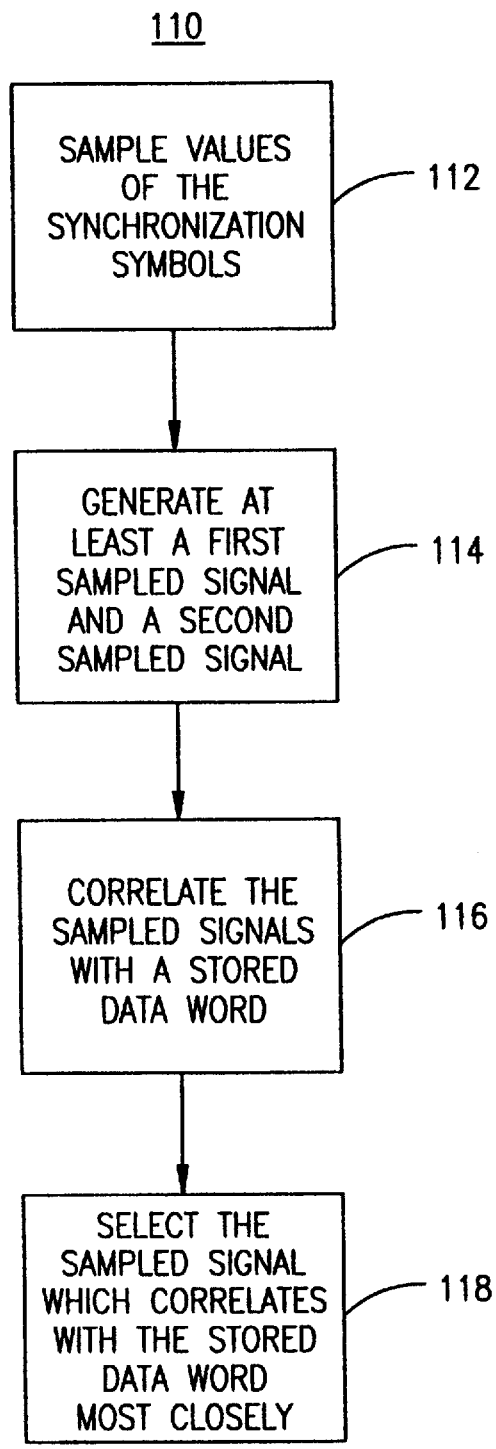
FIG. 4 illustrates a flow diagram listing the method of operation of an embodiment of the present invention.

FIG. 4 illustrates a method, shown generally at 110, of an embodiment of the present invention. The method 110 illustrates the method of operation of the equalizer of the embodiment shown in FIG. 2. The method estimates a channel impulse response of a transmission channel upon which a communication signal having synchronization symbols is transmitted by a transmitter. The communication signal is transmitted at a communication signal symbol rate to a receiver. First, and as indicated by the block 112, values of at least the synchronization symbols are sampled. The values are sampled at a sampling rate greater than the communication signal symbol rate, thereby to sample each of the synchronization symbols at least at a first sampling point and at a second sampling point.

Then, and as indicated by the block 114, at least a first sampled signal and a second sampled signal are generated. The sampled signals are of values representative of the synchronization symbols sampled at the at least first and second sampling points.

Thereafter, and as indicated by the block 116, portions of the sampled signals are correlated with the stored data word. The stored data word is of values representative of the synchronization symbols modified by a selected level of distortion introduced upon the communication signal by the transmitter and the receiver.

Then, and as indicated by the block 118, the sampled signal which correlates most closely with the stored data word is selected, thereby to estimate the channel impulse response.

The channel estimator circuitry and its associated method of channel estimation improves the quality of channel estimation. Because of such improvement, the informational content of a signal transmitted to a receiver including such circuitry is more accurately recreated. The circuitry and method of the present invention is advantageously utilized in a satellite communication system in which only minimal amounts of intersymbol interference are introduced upon a communication channel upon which a communication signal is transmitted. The present invention is also advantageously utilized in other types of digital communication systems, such as a digital, cellular communication system.

Operation of the present invention further facilitates tracking of a dynamic channel having changing characteristics as calculations are performed with fewer parameters. Better equalizer operation is permitted even when larger sequences of data, although transmitted upon a dynamic channel, are equalized because of the improved tracking ability provided by the present invention.

The previous descriptions are of preferred examples for implementing the invention, and the scope of the invention should not necessarily be limited by this description. The scope of the present invention is defined by the following claims.

What is claimed is:

1. A channel estimator for estimating a channel impulse response of a transmission channel upon which a communication signal having synchronization symbols is transmitted by a transmitter, the communication signal transmitted at a communication signal symbol rate to a receiver, said channel estimator comprising:

a symbol sampler coupled to receive signals representative of the communication signal received by the receiver, said symbol sampler for sampling values of a portion of the signal corresponding to at least the synchronization symbols of the signal at a sampling rate greater than the communication signal symbol rate, thereby to sample each of the synchronization symbols at least at a first sampling point and at a second sampling point, and for generating at least a first sampled signal and a second sampled signal of values representative of the synchronization symbols sampled at the first and second sampling points, respectively; and metric calculating circuitry coupled to receive the at least the first sampled signal and the second sampled signal sampled signals generated by said symbol sampler, said metric calculating circuitry for calculating metrics between portions of the at least the first sampled signal and the second sampled signal sampled signals and a stored data word, the stored data word of values representative of the synchronization symbols modified by a selected level of distortion introduced upon the communication signal by the transmitter and the receiver, prior to transmission and subsequent to reception, respectively, of the communication signal, said metric calculating circuitry further for selecting which of the at least first sampled signal and the second sampled signal corresponds most closely with the stored data word, thereby to estimate the channel impulse response.

2. The channel estimator of claim 1 wherein said metric calculating circuitry comprises correlator circuitry for correlating portions of the sampled signals with the stored data word and for selecting which of the at least first sampled signal and the second sampled signal correlates most closely with the stored data word.

3. The channel estimator of claim 2 wherein the sampling rate at which said symbol sampler samples the values of at least the synchronization symbols comprises a sampling rate at least twice as great as the communication signal symbol rate.

4. The channel estimator of claim 2 wherein said symbol sampler generates numbers of sampled signals corresponding to numbers of sampling points at which each of the synchronization symbols is sampled.

5. The channel estimator of claim 4 wherein said correlator circuitry correlates portions of each of the sampled signals with the stored data word and selects the sampled signal which correlates most closely with the stored data word.

6. The channel estimator of claim 2 wherein the stored data word is representative of the synchronization symbols modified further by a selected level of distortion introduced upon the communication signal by the transmission channel.

7. The channel estimator of claim 2 further comprising memory circuitry for storing the stored data word to which said correlator circuitry correlates the portions of the sampled signals.

8. The channel estimator of claim 2 wherein said symbol sampler comprises an analog-to-digital converter.

9. A channel estimator for estimating a channel impulse response of a transmission channel upon which a communication signal having synchronization symbols is transmitted by a transmitter, the communication signal transmitter at a communication signal symbol rate to a receiver, said channel estimator comprising:

a symbol sampler coupled to receive signals representative of the communication signal received by the receiver, said symbol sampler for sampling values of at least each of the synchronization symbols of the signal at a rate at least corresponding to the communication symbol rate and for generating a sampled signal representative thereof; and metric calculating circuitry coupled to receive the sampled signal generated by said symbol sampler, said metric calculating circuitry for calculating metrics between portions of the sampled signal and stored data words, the stored data words of values representative of the synchronization symbols modified by selected levels of distortion introduced upon the communications signal by the transmitter and the receiver, prior to transmission and subsequent to reception, respectively, of the communication signal, said metric calculating circuitry further for selecting, responsive to the metrics, a stored data word of the stored data words which corresponds most closely with the sampled signal, thereby to estimate the channel impulse response.

10. The channel estimator of claim 9 wherein said metric calculating circuitry comprises correlator circuitry for correlating portions of the sampled signals with stored data words and for selecting a stored data word of the stored data words which exhibits best levels of correlation.

11. The channel estimator of claim 9 wherein said stored data words comprise a plurality of stored data words, each of a different value.

12. The channel estimator of claim 9 further comprising memory circuitry for storing the stored data word to which said correlator circuitry correlates the portions of the sampled signals.

13. The channel estimator of claim 9 wherein said symbol sampler comprises an analog-to-digital converter.

14. A method for estimating a channel impulse response of a transmission channel upon which a communication signal having synchronization symbols is transmitted by a transmitter, the communication signal transmitted at a communication signal symbol rate to a receiver, said method comprising the steps of:

sampling values of at least the synchronization symbols of the signal at a sampling rate greater than the communication signal symbol rate, thereby to sample each of the synchronization symbols at least at a first sampling point and at a second sampling point;

generating at least a first sampled signal and a second sampled signal of values representative of the synchronization symbols sampled at the at least first and second sampling points, respectively, during said step of sampling;

calculating metrics between portions of the first sampled signal and a stored data word and the second sampled signal, the stored data word of values representative of the synchronization symbols modified by a selected level of distortion introduced upon the communication signal by the transmitter and the receiver, prior to transmission and subsequent to reception, respectively, of the communication signal; and selecting which of the at least first sampled signal and the second sampled signal corresponds most closely with the stored data word, thereby to estimate the channel impulse response.

15. The method of claim 14 wherein said step of calculating metrics comprises correlating portions of the sampled signals and the stored data word.

16. A method for estimating a channel impulse response of a transmission channel upon which a communication signal having synchronization symbols is transmitted by a transmitter, the communication signal transmitted at a communication signal symbol rate to a receiver, said method comprising the steps of:

sampling values of at least each of the synchronization symbols of a signal representative of the communication signal at a rate at least corresponding to the communication signal symbol rate;

generating a sampled signal representative of the values sampled during said step of sampling;

calculating metrics between portions of the sampled signal and stored data words, the stored data words of values representative of the synchronization symbols modified by selected levels of distortion introduced upon the communication signal by the transmitter and receiver, prior to transmission and subsequent to reception, respectively, of the communication signal; and selecting which of the stored data words corresponds most closely with the sampled signal, thereby to estimate the channel impulse response.

17. The method of claim 16 wherein said step of calculating metrics comprises correlating portions of the sampled signals and the stored word.

18. The method of claim 17 wherein said step of selecting comprises selecting which of the stored data words correlates most closely.

* * * * *

UNITED STATES PATENT AND TRADEMARK OFFICE
CERTIFICATE OF CORRECTION

PATENT NO. : 5,838,739
DATED : November 17, 1998
INVENTOR(S) : Ramesh et al.

Page 1 of 1

It is certified that error appears in the above-identified patent and that said Letters Patent is hereby corrected as shown below:

<u>Title page,</u>
Item [56], replace "7/1993" with -- 6/1993 --

<u>Column 8,</u>
Line 49, replace "$C_2a_0 + C_0a_1$" with -- $C_2a_0 + C_1a_1$ --

Signed and Sealed this

Twenty-fifth Day of September, 2001

Attest:

NICHOLAS P. GODICI
Attesting Officer     Acting Director of the United States Patent and Trademark Office